United States Patent [19]
Cordova

[11] Patent Number: 5,847,829
[45] Date of Patent: Dec. 8, 1998

[54] REDUCTION OF FIBER OPTIC GYROSCOPE VIBRATION AND TEMPERATURE-RAMP SENSITIVITIES BY CONTROLLING COIL GEOMETRICAL PARAMETERS

[75] Inventor: Amado Cordova, West Hills, Calif.

[73] Assignee: Litton Systems, Inc., Woodland Hills, Calif.

[21] Appl. No.: 841,491

[22] Filed: Apr. 23, 1997

[51] Int. Cl.$^6$ .................................................. G01C 19/64
[52] U.S. Cl. ............................................................. 356/350
[58] Field of Search ............................................. 356/350

[56] References Cited

U.S. PATENT DOCUMENTS 5,329,349  7/1994  Patterson et al. ................... 356/350 X
5,546,482  8/1996  Cordova et al. ........................... 385/12

OTHER PUBLICATIONS

Nicholas J. Frigo, Fiber Optic and Laser Sensors, I"Compesation of Linear Sources of Non–Reciprocity in Sagnac Interferometers", Proc. SPIE, vol. 412, 1983.

D.M. ShupeOptical Society of America"Thermally Induced Non–Reciprocity in the FIber Optic Interferometer" Applied Optics, vol. 19(5)1980.

*Primary Examiner*—Vincent P. McGraw
*Attorney, Agent, or Firm*—Lynn & Lynn

[57] ABSTRACT

A method for providing an optical fiber coil having reduced bias vibration and bias temperature-ramp sensitivity by controlling and adjusting coil geometrical factors including the coil potted length, the adhesive layer thickness, the number of turns per layer, the number of layers and the way the winding is terminated. The windings may be terminated to form the coil as a complete quadrupole, a diapole, an incomplete quadrupole or an incomplete diapole. By adjusting geometrical factors of the coil design, a coil for which the residual net Shupe bias is negligible is obtained.

3 Claims, 11 Drawing Sheets

REDUCTION OF FIBER OPTIC
GYROSCOPE VIBRATION AND
TEMPERATURE-RAMP SENSITIVITIES BY
CONTROLLING COIL GEOMETRICAL
PARAMETERS

BACKGROUND OF THE INVENTION

This invention relates generally to fiber optic rotation sensors and particularly to techniques for forming sensing coils used in such sensors to reduce the effects of vibrational and thermally induced nonreciprocities.

A fiber optic rotation sensor uses the Sagnac effect in a coil of optical fiber to detect rotations about a sensing axis that is perpendicular to the plane of the coil. Counterpropagating light waves in the sensing coil experience a phase shift that is related to the rotation rate. The phase shift is seen as a change in the interference pattern formed by the waves when they are combined. The interference pattern is produced when two waves of the same polarization have traversed the fiber optic sensing coil in opposite directions and then interfere. The interference pattern may be monitored by directing it onto a photodetector, which produces an electrical signal indicative of the intensity of the light in the interference fringe pattern.

Theoretical analyses of the fiber optic rotation sensor have led to the conclusion that this sensor could measure rotation rates to 0.01°/h or better. This sensitivity range would permit the fiber optic rotation sensor to be used as a navigation-grade gyro in competition with laser gyros and conventional spinning-mass gyros.

Experimental results show that the sensitivity is limited by non-reciprocity bias error in the fiber optic sensing coil and other parts of the optical path. This non-reciprocity bias error can be greatly reduced by ensuring that the interferometer uses only a single polarization state in a single-mode birefringent fiber. However, even when a single mode and single state of polarization are used, the accuracy of the fiber optic rotation sensor can be limited by a thermally induced nonreciprocity in the fiber coil. This thermally induced nonreciprocity is known as the Shupe effect and is described in Shupe, "Thermally induced nonreciprocity in the fiber-optic interferometer," *Applied Optics*, Vol. 19(5), 654–655 (1980).

Thermally induced nonreciprocity can occur if there is a time-dependent temperature gradient along the fiber. Non-reciprocity arises when the corresponding wave fronts in the two counterrotating beams traverse the same region of the fiber at different times. If the fiber's propagation constant varies at different rates along the fiber, the corresponding wave fronts in the two counterrotating beams traverse a slightly different effective path. This creates a relatively large nonreciprocal phase shift that is indistinguishable from the phase shift caused by rotation.

To prevent the thermally induced nonreciprocity from limiting gyro accuracy, the angular error should be less than 0.00780 for an operating time of one hour. This would require limit temperature changes to $\Delta T \leq 6.7 \times 10^{-3 \circ}$ C. according to Shupe's above-referenced article. It is very difficult to maintain this amount of temperature uniformity under relatively steady operating conditions, let alone during warm-up or the changing environmental conditions that rotation sensors frequently experience.

One method for reducing the Shupe effect is to form the optical fiber from a material having a low refractive-index temperature coefficient. A second method is to wind the fiber-optic coil so that parts of the fiber that are at equal distances from the coil center are beside each other. An example is the well-known quadrupole wind.

Even though quadrupole winding is helpful in reducing the overall Shupe bias due to axisymmetric perturbations, there is always a small residual bias due to an incomplete cancellation of the different contributions within the same quadrupole. These residual biases due to the different quadrupoles add up to an overall bias error.

SUMMARY OF THE INVENTION

The method according to the present invention for reducing FOG bias vibration sensitivity and bias temperature-ramp sensitivity, i.e. non-reciprocal bias errors caused by the Shupe effect, comprises controlling and adjusting coil geometrical factors such as the coil potted length, the adhesive layer thickness, the number of turns per layer, the number of layers and how the coil is terminated (as complete quadrupole, a diapole, an incomplete quadrupole or as an incomplete diapole).

The method according to the present invention for reducing non-reciprocal bias errors caused by the Shupe effect in a fiber optic coil comprises the steps of:

(a) defining a set of geometrical factors for the coil;

(b) selecting a member of the set of geometrical factors;

(c) winding a plurality of fiber optic coils in which the selected geometrical factor is varied;

(d) measuring the Shupe bias in each of the plurality of fiber optic coils;

(e) selecting the optimum value and tolerance for the selected geometrical factor to minimize the Shupe bias; and (f) controlling the selected geometrical factor within the selected tolerance while fabricating the coil.

DESCRIPTION OF THE PREFERRED EMBODIMENT

The most important features of the Shupe effect are:

1. The contribution of a particular coil segment to the Shupe bias error is multiplied by the distance of that segment to the coil midpoint;

2. The contribution of a particular coil segment to the Shupe bias error is a function of the time derivative of the phase perturbation, which is in quadrature with the perturbation if the perturbation is sinusoidal; and 3. Cancellation of Shupe bias errors if the phase perturbations acting on coil segments that are equidistant from the midpoint ("matched segments") are equal in both magnitude and sign.

Theses and other features of the Shupe effect are explained in conjunction with the following mathematical derivations. For convenience in understanding and following the mathematical derivations, the following-listed variables are used:

| | |
|---|---|
| $\epsilon(s, t)$ | time-dependent phase perturbation function; |
| $\epsilon(r, \theta, z, t)$ | time-dependent phase perturbation function; |
| $r, \theta, z$ | coil cylindrical coordinates; |
| $s_{jo}$ | distance of coil midpoint to beginning of $i^{th}$ fiber turn; |
| $r_j, z_i$ | radius and axial position of $i^{th}$ fiber turn; |
| $s, s'$ | coordinates along the coil with the origin located at the coil midpoint and s increasing in the CCW direction and s' increasing in the CW direction; |
| $l$ | coordinates along the coil with the origin located at one of the coil ends; |
| $\tau$ | light transit time through the coil; |
| $L_c$ | coil length; |
| $T$ | shortest characteristic time of phase perturbation; |
| $N$ | number of turns in fiber optic sensing coil; |
| $n$ | refractive index; and |
| $\lambda$ | wavelength (in vacuum). |

Figure 1:
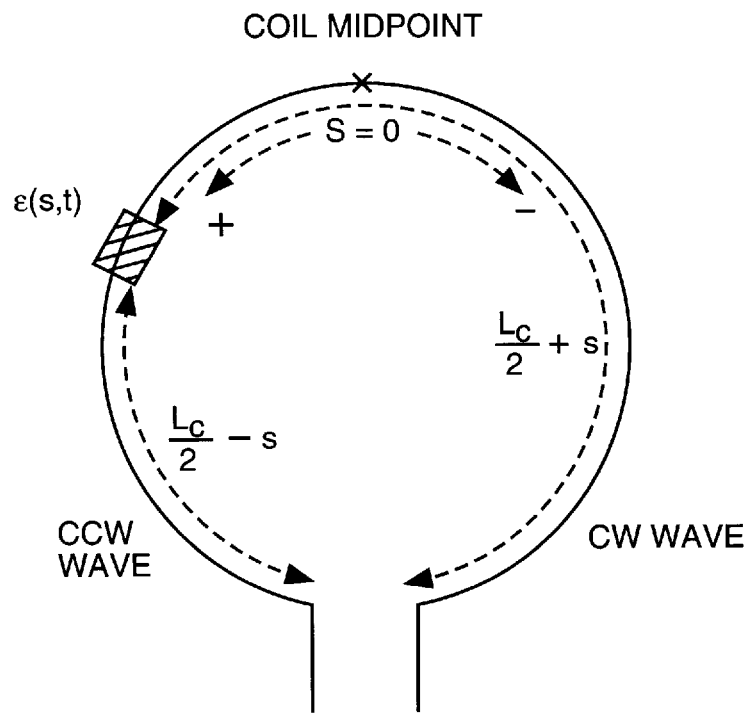
FIG. 1 illustrates a fiber optic coil and parameters used in understanding the Shupe effect.

Assume that a time-dependent phase perturbation is acting on a sensing coil 10 that is schematically represented in FIG. 1. The phase perturbation function is defined as the change of phase per unit length $$\left(\frac{2\pi}{\lambda}\right)\left(\frac{d(ns)}{ds}\right)$$

experienced by the light when traversing a small coil segment of length $dl=ds$. This phase change is due to temperature or pressure perturbations that act on the fiber.

The time delays of the CCW and the CW waves from a particular coil segment to the coil ends are $$\tau\left(\frac{1}{2} - \frac{s}{L_c}\right) \text{ and } \tau\left(\frac{1}{2} + \frac{s}{L_c}\right),$$

respectively. Therefore, the overall phase changes on the CCW and the CW waves due to the perturbation are obtained by integrating the contributions of all coil segments:

$$\Delta\Phi_{ccw}(t) = \int_{-L_c/2}^{L_c/2} \epsilon\left[s, t - \tau\left(\frac{1}{2} - \frac{s}{L_c}\right)\right] ds. \quad (1)$$

$$\Delta\Phi_{cw}(t) = \int_{-L_c/2}^{L_c/2} \epsilon\left[s, t - \tau\left(\frac{1}{2} + \frac{s}{L_c}\right)\right] ds. \quad (2)$$

The Shupe bias error is given by the phase difference between the CCW and the CW waves, which is obtained by subtracting Eq. (2) from Eq. (1):

$$\Delta\Phi_{Shupe}(t) = \int_{-L_c/2}^{L_c/2} \left\{ \epsilon\left(s, t - \frac{\tau}{2} + \frac{\tau s}{L_c}\right) - \epsilon\left(s, t - \frac{\tau}{2} - \frac{\tau s}{L_c}\right) \right\} ds. \quad (3)$$

Changing the time origin from 0 to $\tau/2$ makes the expression for the Shupe bias error become:

$$\Delta\Phi_{Shupe}(t) = \int_{-L_c/2}^{L_c/2} \left\{ \epsilon\left(s, t + \frac{\tau s}{L_c}\right) - \epsilon\left(s, t - \frac{\tau s}{L_c}\right) \right\} ds. \quad (4)$$

Assume that the phase perturbation is a continuous differentiable function that can be expanded in Taylor series:

$$\epsilon(s, t + \Delta t) = \epsilon(s, t) + \quad (5)$$

$$\left.\frac{\partial \epsilon}{\partial t}\right|_{(s,t)} \Delta t + \frac{1}{2} \left.\frac{\partial^2 \epsilon}{\partial t^2}\right|_{(s,t)} (\Delta t)^2 + \frac{1}{6} \left.\frac{\partial^3 \epsilon}{\partial t^3}\right|_{(s,t)} (\Delta t)^3 + \ldots$$

where $$\Delta t = \frac{\pm \tau s}{L_c}$$

and, thus $$|\Delta t| \leq \frac{\tau}{2}.$$

Also assume that the phase perturbation function is characterized by a time T that is related to the maximum rate of change $\omega$ of the perturbation by $T=2\pi/\omega$.

If the characteristic time T is much longer that the coil light transit time, it is expected that the higher order terms in the Taylor series will be small. Therefore, the Taylor series can be truncated and terms up to second order only need to be considered. The expression of Eq. (5) then becomes:

$$\epsilon\left(s, t + \frac{\tau s}{L_c}\right) \approx \epsilon(s,t) + \quad (6)$$

$$\frac{\tau s}{L_c} \left.\frac{\partial \epsilon}{\partial t}\right|_{(s,t)} + \frac{1}{2} \left(\frac{\tau s}{L_c}\right)^2 \left.\frac{\partial^2 \epsilon}{\partial t^2}\right|_{(s,t)}.$$

The Shupe bias error expression of Eq. (4) becomes:

$$\Delta\Phi_{Shupe}(t) = \int_{-L_c/2}^{L_c/2} \left\{ \frac{\tau s}{L_c} \left.\frac{\partial \epsilon}{\partial t}\right|_{(s,t)} - \right. \quad (7)$$

-continued $$\left(-\frac{\tau s}{L_c}\right)\frac{\partial \epsilon}{\partial t}\bigg|_{(s,t)}\right\} ds.$$

Combining terms in Eq. (7) gives:

$$\Delta\Phi_{Shupe}(t) = \frac{2\tau}{L_c} \int_{-L_c/2}^{L_c/2} \frac{\partial \epsilon}{\partial t}\bigg|_{(s,t)} s \, ds. \tag{8}$$

It should be noticed that the even terms of the expansion cancel out in the expression for the Shupe bias error.

Now a few mathematical steps are applied to Eq. (8) to arrive at a more useful expression for the Shupe bias error. First the integral of Eq. (8) is separated into two steps:

$$\Delta\Phi_{Shupe}(t) = \frac{2\tau}{L_c} \left\{ \int_{0}^{L_c/2} \frac{\partial \epsilon}{\partial t}\bigg|_{(s,t)} s \, ds + \int_{-L_c/2}^{0} \frac{\partial \epsilon}{\partial t}\bigg|_{(s,t)} s \, ds \right\}. \tag{9}$$

Now the integration limits of the second integral in Eq. (9) are reversed:

$$\int_{-L_c/2}^{0} \frac{\partial \epsilon}{\partial t}\bigg|_{(s,t)} s \, ds = -\int_{0}^{-L_c/2} \frac{\partial \epsilon}{\partial t}\bigg|_{(s,t)} s \, ds. \tag{10}$$

Now change the integration variable from s to s'=−s:

$$-\int_{0}^{L_c/2} \frac{\partial \epsilon}{\partial t}\bigg|_{(s',t)}(-s')(-ds') = -\int_{0}^{L_c/2} \frac{\partial \epsilon}{\partial t}\bigg|_{(s',t)} s' \, ds'. \tag{11}$$

Finally, the following expression for the Shupe bias error is obtained:

$$\Delta\Phi_{Shupe}(t) = \frac{2\tau}{L_c} \left\{ \int_{0}^{L_c/2} \frac{\partial \epsilon}{\partial t}\bigg|_{(s,t)} s \, ds - \int_{0}^{L_c/2} \frac{\partial \epsilon}{\partial t}\bigg|_{(s',t)} s' \, ds' \right\}. \tag{12}$$

The previous derivation of the expression of Eq. (12) for the Shupe bias error is completely general. It is based on fundamental properties of the Sagnac loop, namely that the Sagnac loop operates as a delay line with a characteristic time τ, which is the light transit time through the coil and that the interfering waves (CW and CCW) travel in opposite directions in the sensing loop. In addition, the derivation assumes that the phase perturbation will vary with time very slowly with respect to the light transit time through the coil The contribution of a coil segment to the Shupe bias error is just the difference in the phase perturbation acting on that segment at two times: the time $t_1$ at which the CCW wave passes through that segment, and the time $t_2$ at which the CW wave passes through the same segment (see Eqs. (3) or (4)). The difference $|t_2-t_1|$ is smaller than τ. Consequently, since it is assumed that the phase perturbation is slow with respect to τ, the higher order terms in the Taylor series for the phase perturbation function (for example, to second order) may be neglected.

Because of making a second order expansion of the phase perturbation function, the contribution of the coil segment to the Shupe bias error becomes proportional to the time-derivative of the phase perturbation and the distance of the segment to the coil midpoint because $|t_2-t_1|$ is proportional to that distance.

The variables s and s' in Eq. (12) are both positive, but they are measured in opposite directions. That is, one increases in the CCW direction and the other one in the CW direction Eq. (12) suggests dividing the coil in two halves separated by the coil midpoint, the "CCW half (CCW turns)" and the "CW half (CW turns)." The CCW half is the part of the coil which is traversed by the CCW wave after this wave has passed the coil midpoint. A similar statement applies for the CW half.

Furthermore, Eq. (12) facilitates an understanding of the importance of "matched coil segments." For each coil segment in the CCW half there is another segment in the CW half which is at the same distance to the coil midpoint ("matched segments"). As Eq. (12) shows, if the phase perturbations acting on matched segments are equal in magnitude and sign then the contributions of the matched segments to the Shupe bias error cancel out.

This is the principle on which the methods of coil winding for reduction of the Shupe error are based. The standard quadrupole wind is an example of a winding pattern designed to minimize the influence of radial time-varying temperature gradients. Certain types of quadrupole configurations also help reduce the effect of axial gradients. However, the Shupe bias error due to perturbations not having axial symmetry (transverse or azimuthal perturbations) are not necessarily reduced by quadrupole winding.

Eq. (8) is also useful in understanding the Shupe effect. If the time rate of change of the perturbation is an even function of the coordinate s, then the integral vanishes because the product of that function times s is odd; and the integral of an odd function over an interval symmetrical about the origin is zero. If the perturbation is mainly "radial" or "axial," quadrupole winding tends to make the perturbation an even function of s, therefore, the Shupe bias error is small. However, if the rate of change of the perturbation is an odd function of s, its product with s is even, thus, the contributions from the positive and the negative s coordinates add up instead of subtract and the Shupe integral can be large, even with quadrupole winding. The latter could be the case for transverse vibration when the vibration axis is perpendicular to the line joining the spool center and the coil midpoint. The general expressions for the Shupe bias error derived above apply to Shupe 1 and Shupe 2 ("pressure" Shupe) and to vibration-Shupe (transverse and axial).

In the next portion of the derivation, the phase perturbation function is written in terms of the cylindrical coordinates r, θ, z and the time coordinate t. For each fiber turn, the coordinates r and z are approximately constant. Thus the integral per fiber turn is over the angular coordinate θ only. This is the only step in the calculation where an integration has to be performed. This step involves the azimuthal (θ) dependence of the perturbation only. The rest of the calculation consists of summing over the contributions of all turns.

Figure 2:
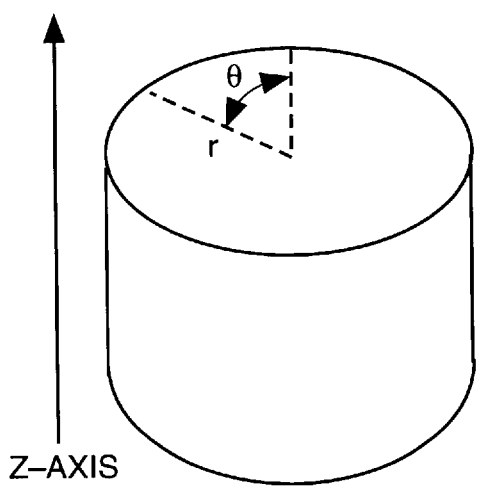
FIG. 2 illustrates a cylindrical coordinate system used in analyzing the Shupe effect in a fiber optic coil.

Referring to FIG. 2, a system of cylindrical coordinates r, θ, z is defined. The counterclockwise direction is arbitrarily selected as the direction of positive angle θ. The coil is divided into CCW and CW turns. The CCW turns are those in which the light traverses when going in the CCW direction after it has passed the coil midpoint. Likewise, the CW turns are those in which the light traverses when going in the CW direction after it has passed the coil midpoint.

Figure 3:
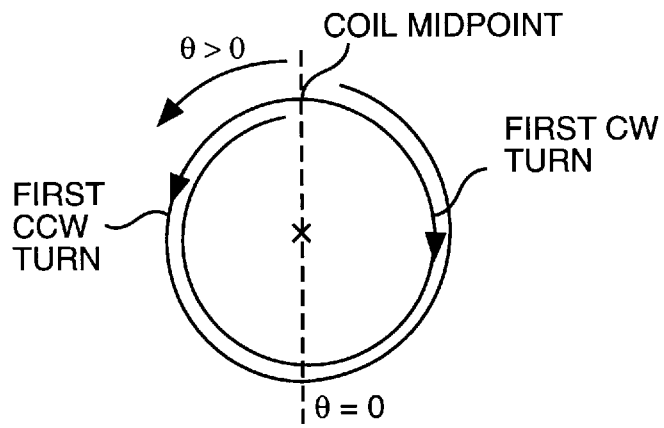
FIG. 3 illustrates a clockwise turn and counterclockwise turn in a fiber optic coil.

Let the angle θ be zero at the line joining the center of the spool with the coil midpoint. From that line and the coil midpoint the first CCW and CW turns are defined as shown in FIG. 3. The beginning point of the $i^{th}$ turn is defined as the point at which that turn intersects the previously defined line where θ=0. Further, let $s_{jo}$ be the distance along the coil from that point to the coil midpoint. In general the distance will be an integral number of circular perimeters.

The Shupe bias error is calculated as an integral in cylindrical coordinates of the time-derivative of the phase perturbation function. The second member of Eq. (12) above will be transformed into a sum over the fiber turn contributions. Because for each turn the coordinates r and z are approximately constant, the integral per turn is over the angle θ only.

It should be noted that because of the convention of positive θ, for a CCW turn the angle θ varies from 0 to 2π, whereas for a CW turn, the angle θ varies from 0 to −2π. This is an important point because the first integral in Eq. (12) is performed in the sense of increasing s, which is increasing θ and the second integral is performed in the sense of decreasing θ. Eq. (12) thus becomes $$\Delta\Phi_{Shupe}(t) = \frac{2\tau}{L_c} \left\{ \sum_{i=1}^{N_{CCW}} \int_0^{2\pi} \frac{\partial\epsilon}{\partial t}\bigg|_{(r_i,\theta,z_i,t)} s\, ds - \sum_{j=1}^{N_{CW}} \int_0^{-2\pi} \frac{\partial\epsilon}{\partial t}\bigg|_{(r_j,\theta,z_j,t)} s'\, ds' \right\}. \quad (13)$$

Figure 4:
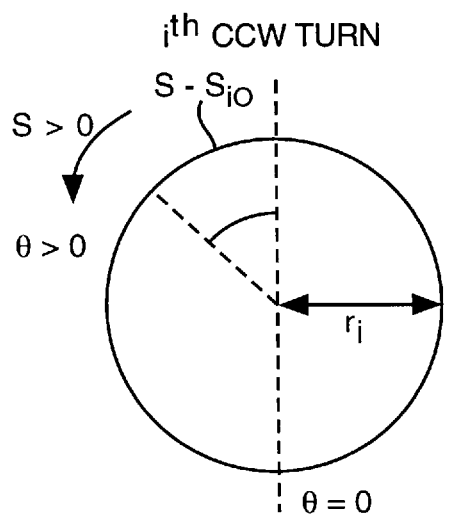
FIG. 4 illustrates parameters of the $i^{th}$ counterclockwise turn in a fiber optic coil.

The next step is to find relationships between s and θ and between s' and θ. The relationships are summarized below. Referring to FIG. 4, for the $i_{th}$ CCW turn as shown s>0 and θ>0. The angle θ may be expressed as $$\theta = \frac{s - s_{io}}{r_i}. \quad (14)$$

Solving for the coordinate s gives $$s = r_i\theta + s_{io}. \quad (15)$$

The variables $r_j$, s, $s_{jo}$, are all greater than zero. The angle θ satisfies the relation 0<θ<2π. The incremental distance ds=$r_i$dθ.

Figure 5:
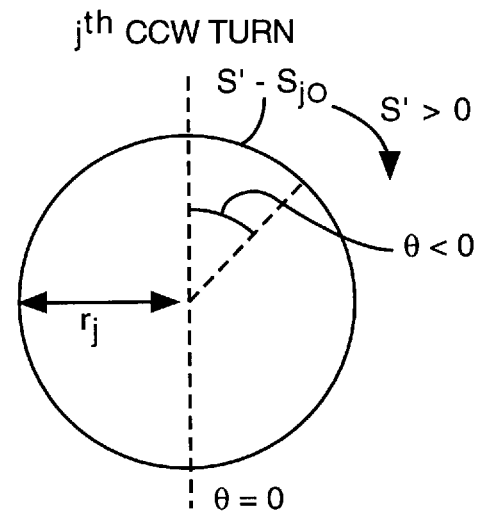
FIG. 5 illustrates parameters of the $j^{th}$ counterclockwise turn in a fiber optic coil.
Figure 6:
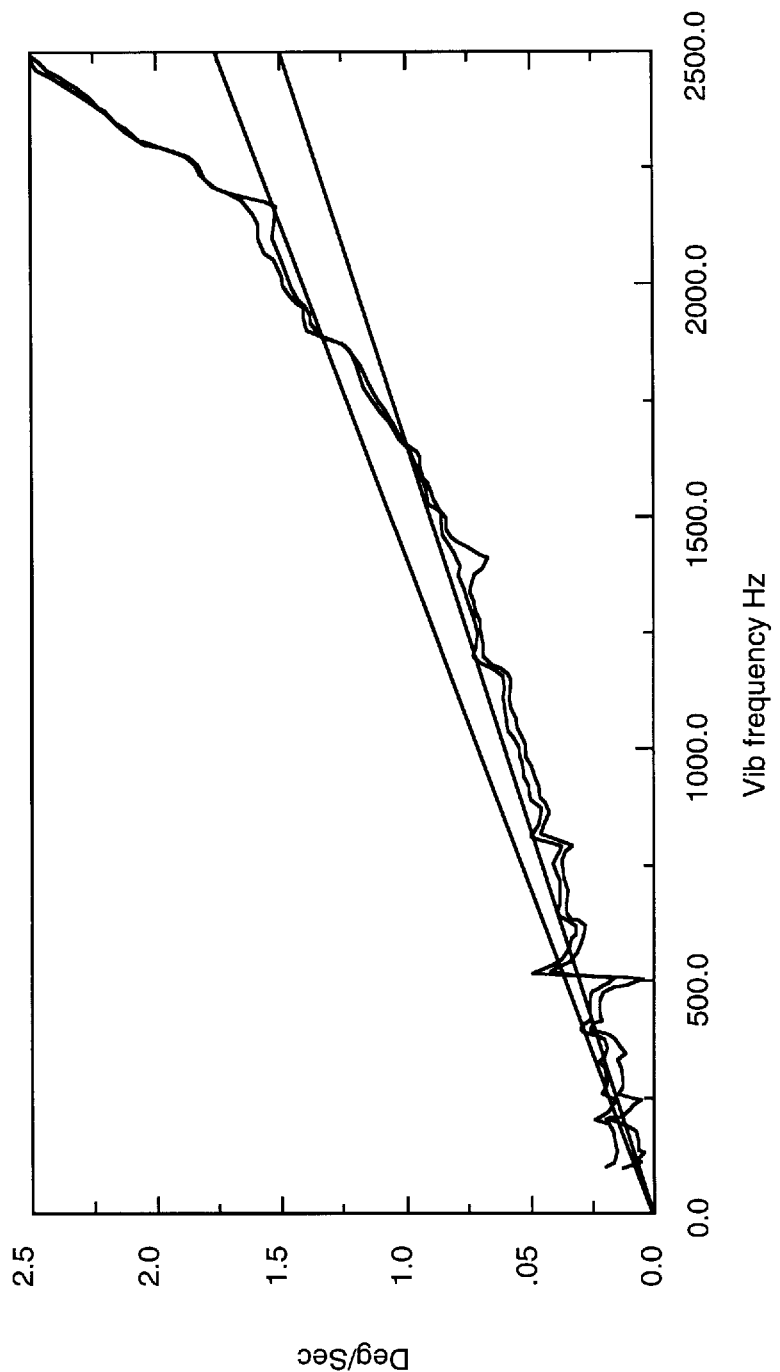
FIG. 6 graphically illustrates the measured rotation rate output of a first fiber optic rotation sensor as a function of vibration frequency for vibrations along the axis of the coil.
Figure 7:
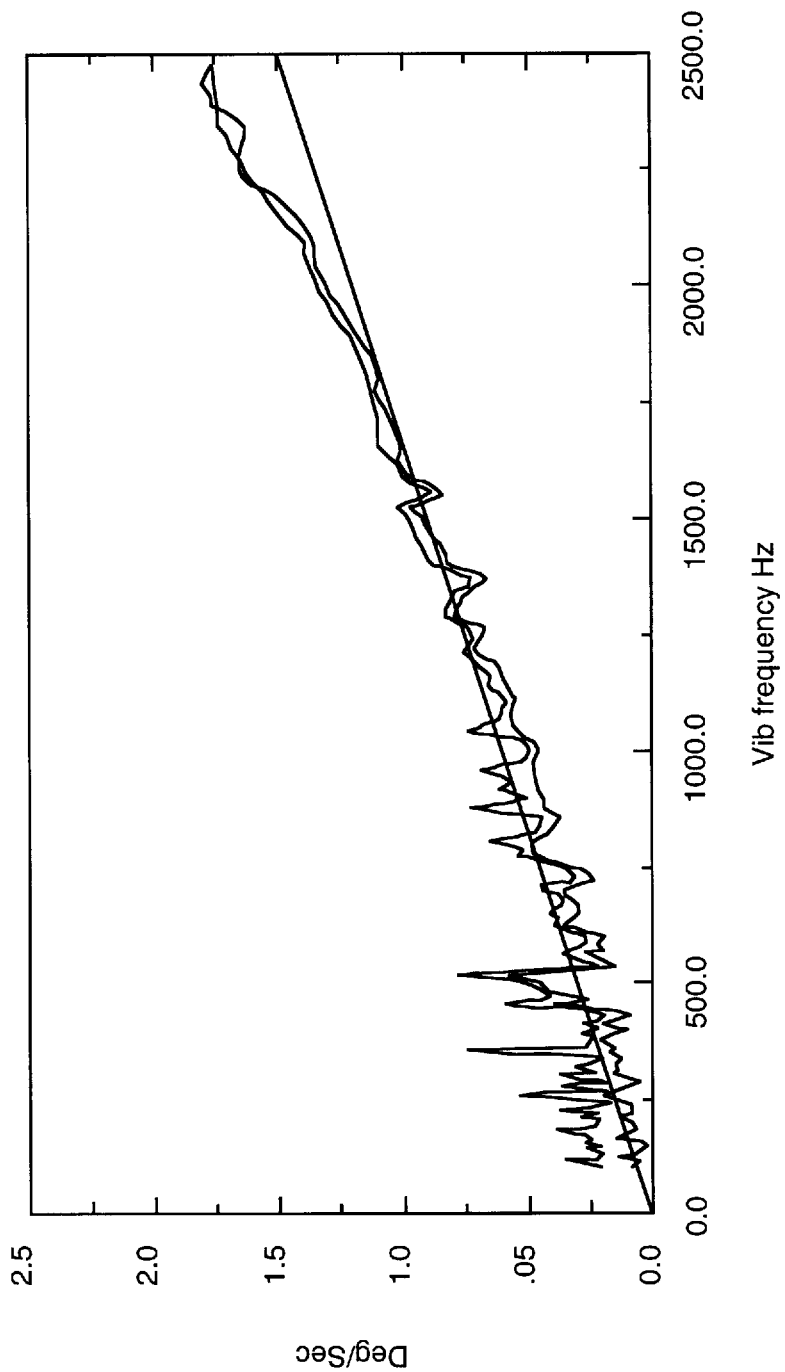
FIG. 7 graphically illustrates the measured rotation rate output of a second fiber optic rotation sensor coil as a function of vibration frequency for vibrations along the axis of the coil.
Figure 8:
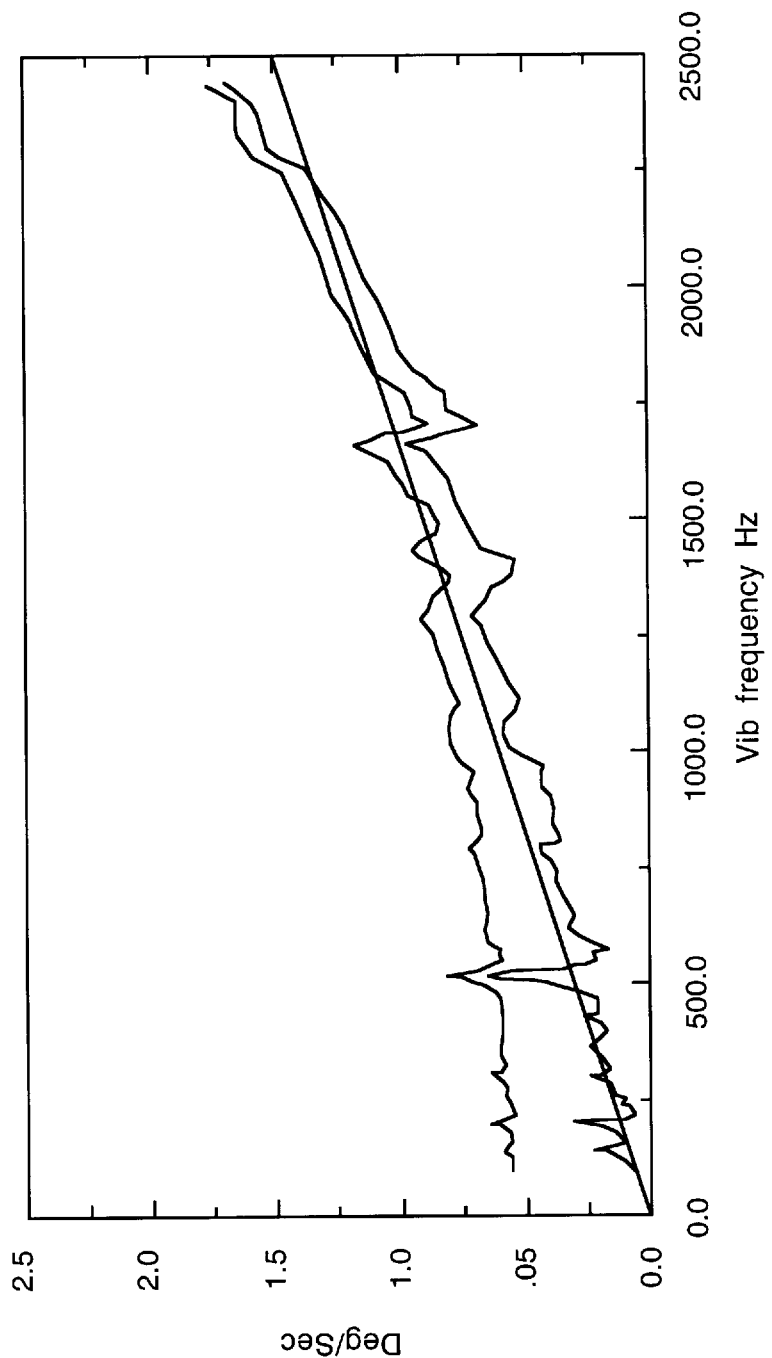
FIG. 8 graphically illustrates the measured rotation rate output of a third fiber optic rotation sensor as a function of vibration frequency for vibrations along the axis of the coil.
Figure 9:
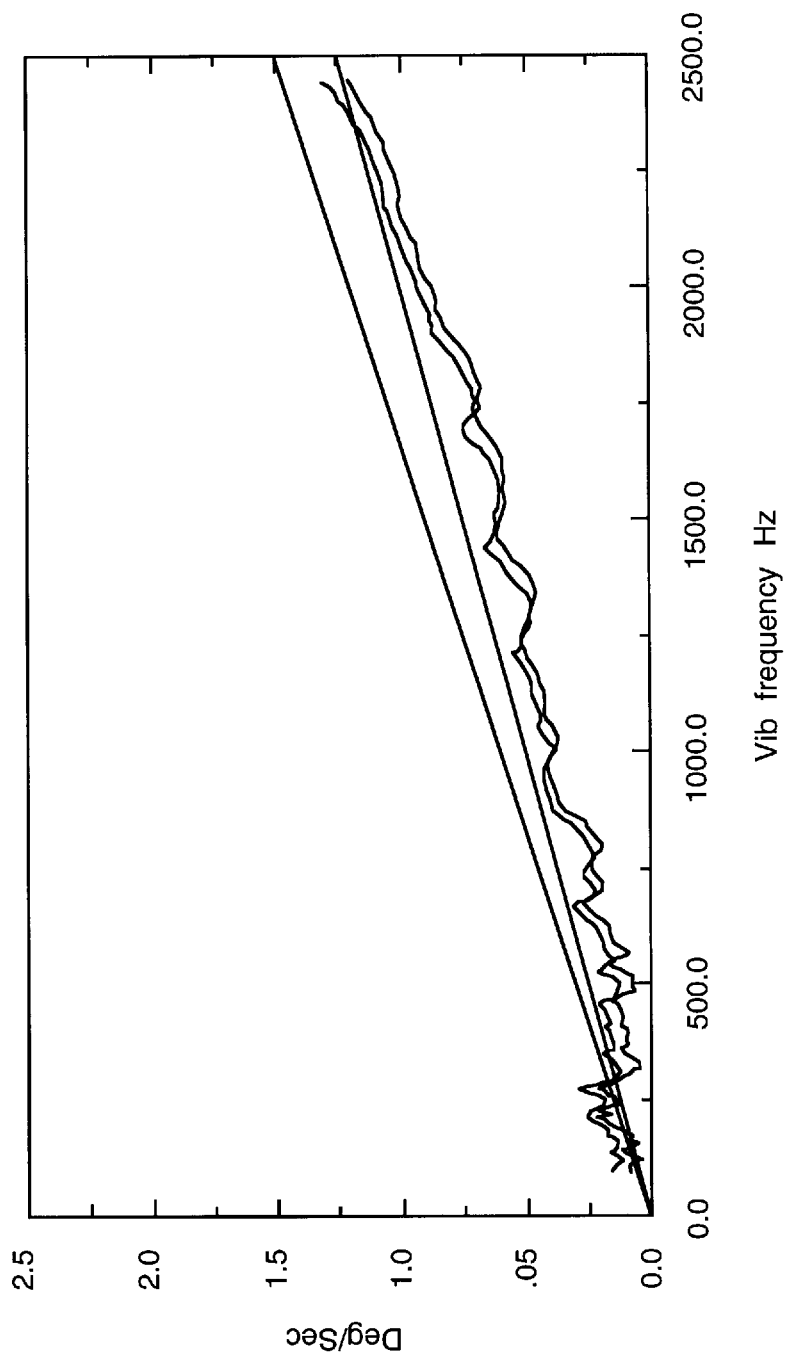
FIG. 9 graphically illustrates the measured rotation rate output of a fourth fiber optic rotation sensor as a function of vibration frequency for vibrations along the axis of the coil.
Figure 10:
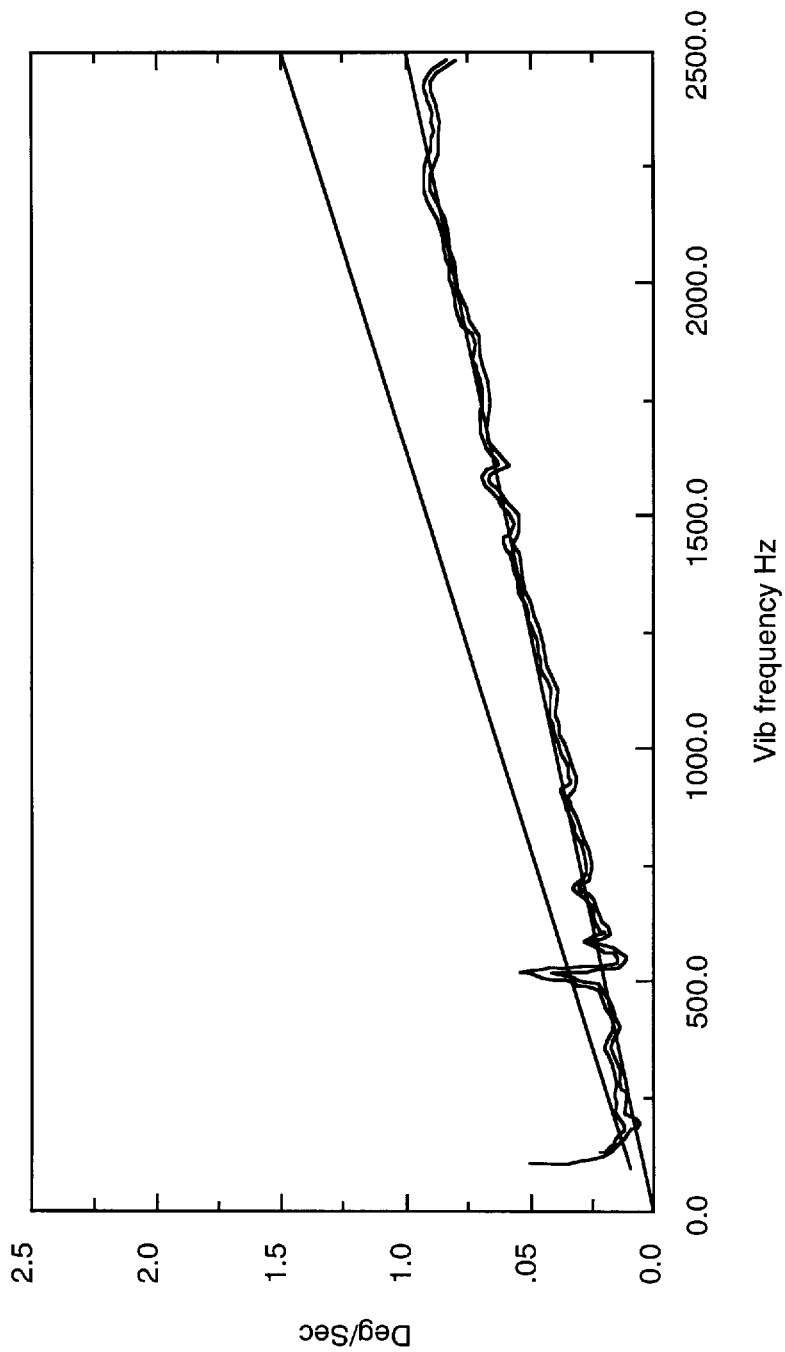
FIG. 10 graphically illustrates the measured rotation rate output of a fifth fiber optic rotation sensor coil as a function of vibration frequency for vibrations along the axis of the coil.
Figure 11:
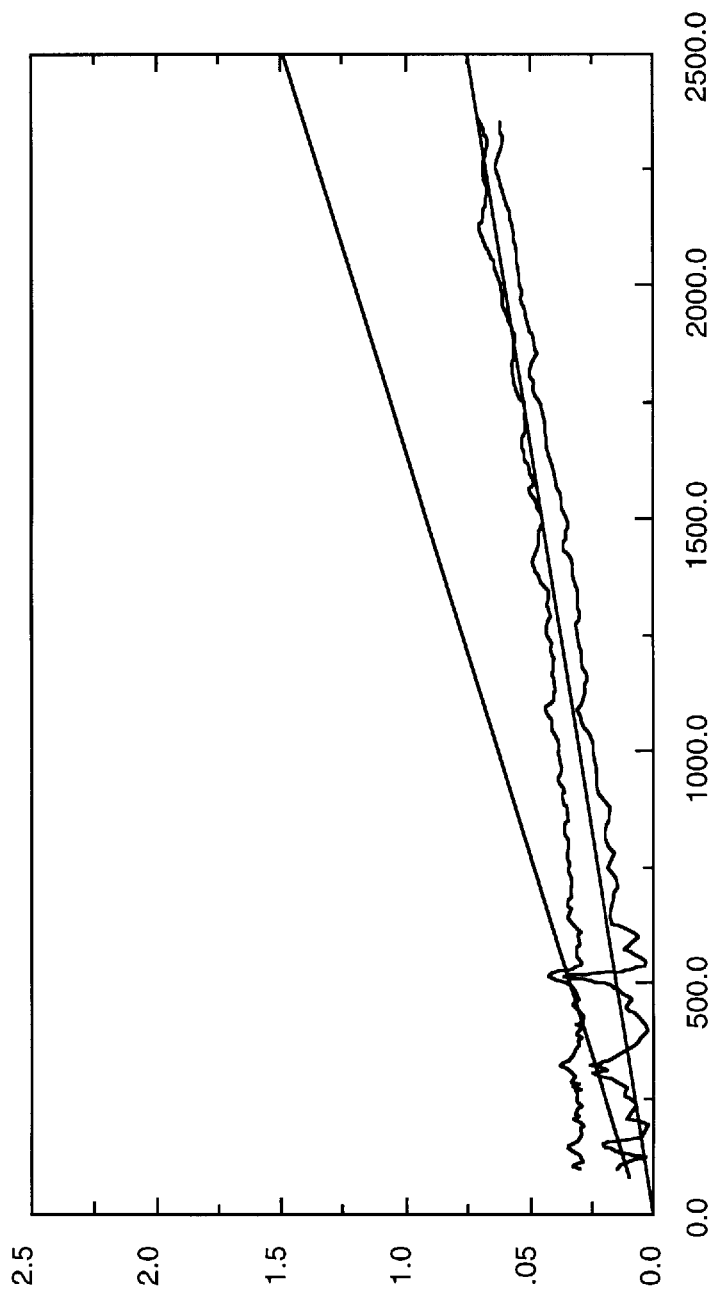
FIG. 11 graphically illustrates the measured rotation rate output of a sixth fiber optic rotation sensor coil as a function of vibration frequency for vibrations along the axis of the coil.
Figure 12:
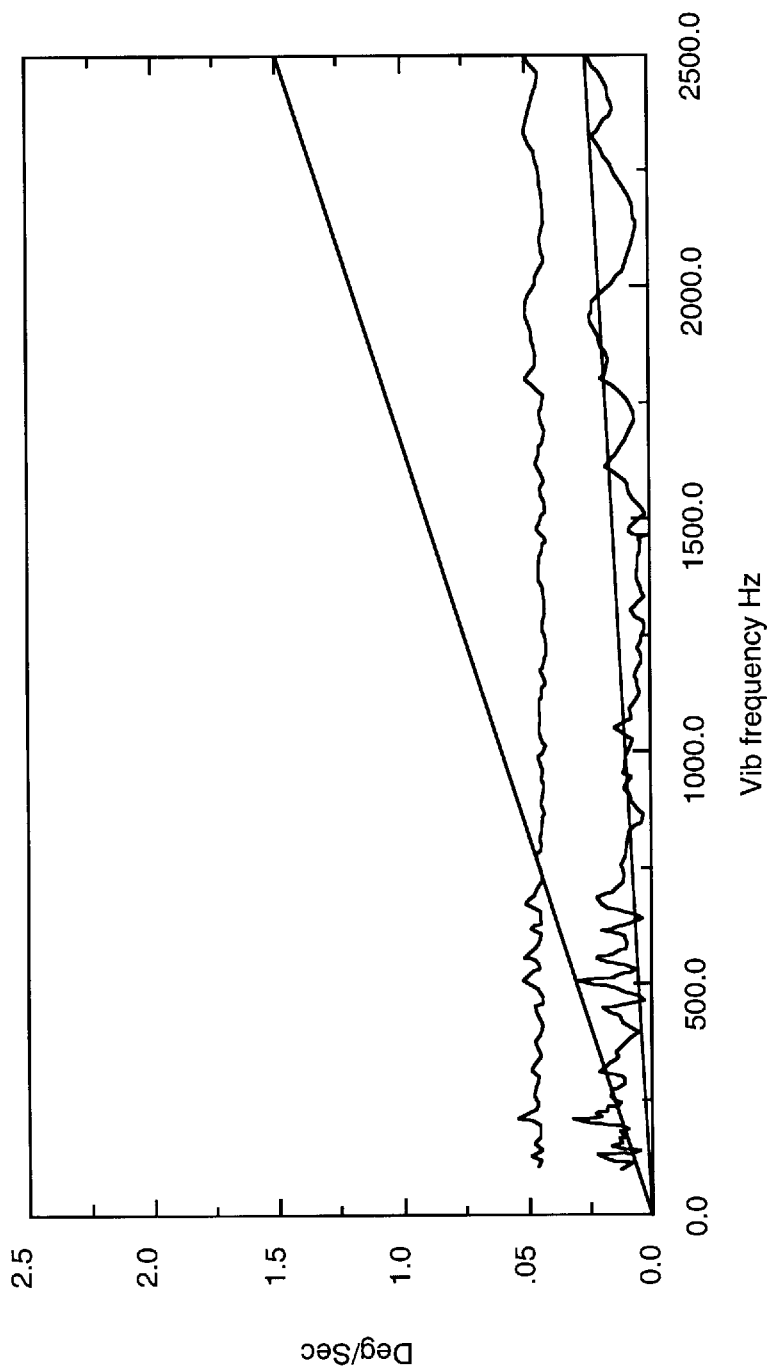
FIG. 12 graphically illustrates the measured rotation rate output of a seventh fiber optic rotation sensor coil as a function of vibration frequency for vibrations along the axis of the coil FIG. 13 graphically illustrates the measured rotation rate output of an eighth fiber optic rotation sensor coil as a function of vibration frequency for vibrations along the axis of the coil.
Figure 13:
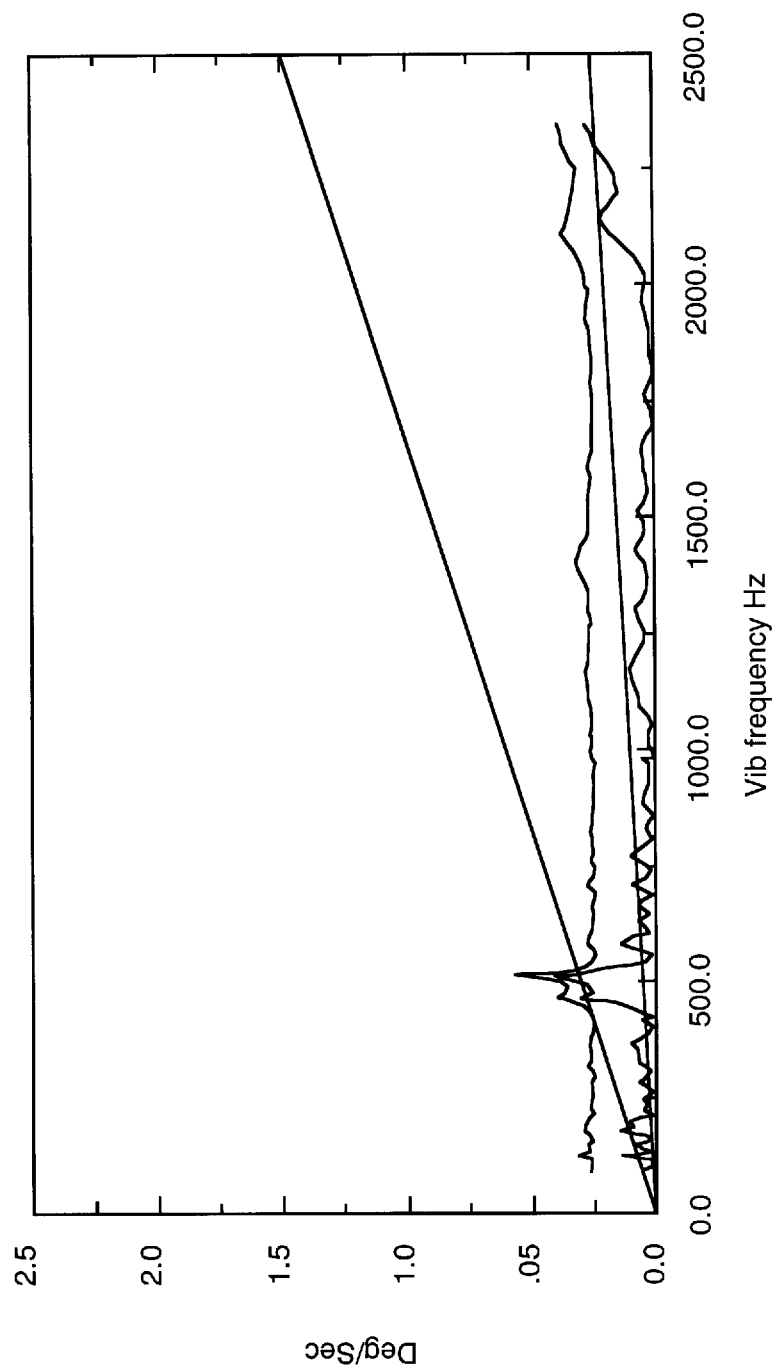

For the $j^{th}$ CW turn, referring to FIG. 5, the angle θ is given by $$\theta = \frac{s' - s_{jo}}{r_j}. \quad (16)$$

Solving for the coordinate s' gives $$s' = s_{jo} r_j \theta. \quad (17)$$

The variables $r_j$, s', $s_{jo}$ are all greater than zero. The angle 0 satisfies the relation −2π<θ>0. The incremental distance ds'=−$r_j$dθ.

The contribution of the $i^{th}$ CCW turn to the Shupe bias error is $$\Delta\Phi_i(t) = \frac{2\tau}{L_c} \int_0^{2\pi} \frac{\partial\epsilon}{\partial t}\bigg|_{(r_i,\theta,z_i,t)} (r_i\theta + s_{io})r_i\, d\theta. \quad (18)$$

Likewise, the contribution of the $j^{th}$ CW turn to the Shupe bias error is:

$$\Delta\Phi(t) = -\frac{2\tau}{L_c} \int_0^{-2\pi} \frac{\partial\epsilon}{\partial t}\bigg|_{(r_j,\theta,z_j,t)} (r_j\theta - s_{jo})r_j. \quad (19)$$

The integral of Eq. (19) is performed in the positive s' direction, which is from θ=0 to θ=−2π. Reversing the limits of integration in Eq. (19) gives $$\Delta\Phi(t) = \frac{2\tau}{L_c} \int_{-2\pi}^{0} \frac{\partial\epsilon}{\partial t}\bigg|_{(r_j,\theta,z_j,t)} (r_j\theta - s_{jo})r_j. \quad (20)$$

Finally, summing over the total turns gives the following general expression for the Shupe bias error:

$$\Delta\Phi_{Shupe}(t) = \frac{2\tau}{L_c} \left\{ \sum_{i=1}^{N_{CCW}} r_i \int_0^{2\pi} \frac{\partial\epsilon}{\partial t}\bigg|_{(r_i,\theta,z_i,t)} (r_i\theta + s_{io})\, d\theta + \sum_{j=1}^{N_{CW}} r_j \frac{2\tau}{L_c} \int_{-2\pi}^{0} \frac{\partial\epsilon}{\partial t}\bigg|_{(r_j,\theta,z_j,t)} (r_j\theta - s_{jo})r \right\}. \quad (21)$$

For physical reasons the phase perturbation function has to be periodic in 0 with period 2π. Therefore, it can be expressed in terms of a Fourier series which contains a term independent of θ, a sum over cosinusoidal terms and a sum over sinusoidal terms. Shupe bias error expressions for the different terms of that Fourier series are presented below. The contributions of the CCW and the CW turns have opposite signs in the expression for the Shupe bias error due to the θ-independent term of Eq. (26) below, whereas they have the same sign in the expression for the sinusoidal terms of Eq. (38) below. In addition, the Shupe bias due to the cosinusoidal terms of Eq. (32) below is zero.

Typical winding patterns are designed to locate each segment of the CCW coil-half in close proximity to its matched segment of the CW coil-half. In this way, the time-derivatives of the phase perturbations acting on both the segments are about equal in both magnitude and sign. Therefore their contributions to the Shupe bias error tend to cancel each other only for a θ-independent phase perturbation function or for the θ-independent term of the Fourier series.

On the contrary, for a sinusoidal phase perturbation function, if the time-derivatives of the phase perturbations acting on matched segments are equal in sign, their contributions to the Shupe bias error are added instead of subtracted. Therefore, the standard quadrupole wind by itself is probably not helpful in reducing the Shupe bias error due to sinusoidal perturbations.

In order to satisfy the coil boundary conditions, the dynamic strain due to transverse vibration and, therefore, the resulting phase perturbation function, have to be sinusoidal functions of θ. As a consequence, the conclusion stated above on the sinusoidal terms of the Fourier series applies to transverse vibration as well.

The following variables are used in addition to those listed above:

$\epsilon_o(r,z,t)$  θ-independent term of the Fourier series for the phase perturbation function;

$\epsilon_n(r,z,t)\cos(n\theta)$  $n^{th}$ cosinusoidal term of the same Fourier series; and $\epsilon_m(r,z,t)\sin(m\theta)$  $m^{th}$ sinusoidal term of the same Fourier series.

In the most general case, the phase perturbation function has to be a periodic function of the angle θ with period 2π.

Therefore, the phase perturbation function can be expressed in terms of a Fourier series as follows:

$$\epsilon(r,\theta,z,t) = \epsilon_o(r,z,t) + \sum_{n=1}^{\infty} \epsilon_n(r,z,t)\cos(n\theta) + \sum_{m=1}^{\infty} \epsilon_m(r,z,t)\sin(m\theta). \quad (22)$$

where the coefficients $\epsilon_o$, $\epsilon_n$, and $\epsilon_m$ are functions of r, z and t but not functions of θ.

In the following portion of this disclosure calculates the Shupe bias error due to the different terms in the Fourier series of the phase perturbation function. The starting point for this calculation is Eq. (21)

Shupe Bias Error Due to θ-Independent Term

We have to evaluate the integrals in Eq. (21) using only the Shupe bias terms due to the θ-independent term $\epsilon_o(r, z, t)$ of Eq. (22). The time derivative of this term is also independent of θ and can be taken out of the integral, so that the result is:

$$\Delta\Phi_{Shupe,o}(t) = \frac{2\tau}{L_c} \left\{ \sum_{i=1}^{N_{CCW}} r_i \frac{\partial \epsilon_o}{\partial t}\bigg|_{(r_i,z_i,t)} \int_0^{2\pi} (r_i\theta + s_{io}) d\theta + \right.$$

$$\left. \sum_{j=1}^{N_{CCW}} r_i \frac{\partial \epsilon_o}{\partial t}\bigg|_{r_j,z_j,t} \int_{-2\pi}^0 (r_j\theta - s_{jo}) d\theta \sum_{j=1}^{N_{CCW}} r_i \frac{\partial \epsilon_o}{\partial t}\bigg|_{r_j,z_j,t} \int_{-2\pi}^0 (r_j\theta - s_{jo}) d\theta \right\}. \quad (23)$$

The two integrals yield:

$$\int_0^{2\pi} (r_i\theta + s_{io}) d\theta = 2\pi[\pi r_i + s_{io}]. \quad (24)$$

and $$\int_{-2\pi}^0 (r_j\theta + s_{jo}) d\theta = 2\pi[\pi r_j + s_{jo}]. \quad (25)$$

Therefore the Shupe bias error due to the θ-independent term of the phase perturbation function is given by:

$$\Delta\Phi_{Shupe,o}(t) = \frac{4\pi\tau}{L_c} \left\{ \sum_{i=1}^{N_{CCW}} r_i[\pi r_i + s_{io}] \frac{\partial \epsilon_o}{\partial t}\bigg|_{(r_i,z_i,t)} - \sum_{j=1}^{N_{CW}} r_i[\pi r_j + s_{jo}] \frac{\partial \epsilon_o}{\partial t}\bigg|_{r_j,z_j,t} \right\} \quad (26)$$

It should be noted that in the above expression no integrals are involved, only sums. Furthermore, the contributions form the CCW turns and from the CW turns have opposite signs.

Shupe Bias Error Due To Cosinusoidal Terms

Now the integrals of Eq. (21) using the term of the form $\epsilon_n(r, z, t) \cos(n\theta)$ are evaluated. The factor $$\frac{\partial \epsilon_n}{\partial t}\bigg|_{r_j,z_j,t}$$

can be taken out of the integrals. Thus, for each turn n, there is a Shupe bias error equal to:

$$\Delta\Phi_{Shupe,n}(t) = \frac{2\tau}{L_c} \left\{ \sum_{i=1}^{N_{CCW}} r_i \frac{\partial \epsilon_n}{\partial t}\bigg|_{r_j,z_j,t} \int_0^{2\pi} (r_i\theta + s_{io}) \cos n\theta d\theta + \right. \quad (27)$$

$$\left. \sum_{j=1}^{N_{CW}} r_j \frac{\partial \epsilon}{\partial t}\bigg|_{r_j,z_j,t} \int_{-2\pi}^0 (r_j\theta + s_{jo}) \cos n\theta d\theta \right\}.$$

Performing an integration by parts yields the following result for the CCW turns:

$$\int_0^{2\pi} \theta \cos n\theta = \frac{\theta \sin n\theta}{n} \bigg]_0^{2\pi} - \int_0^{2\pi} \frac{\sin n\theta}{n} d\theta = 0 \quad (28)$$

and $$\int_0^{2\pi} (r_i\theta + s_{io}) \cos n\theta d\theta = 0. \quad (29)$$

Similarly for the CW turns:

$$\int_{-2\pi}^0 \theta \cos n\theta = \frac{\theta \sin n\theta}{n} \bigg]_{-2\pi}^0 - \int_{-2\pi}^0 \frac{\sin n\theta}{n} d\theta = 0 \quad (30)$$

and $$\int_{-2\pi}^0 (r_i\theta - s_{io}) \cos n\theta d\theta = 0. \quad (31)$$

All of the integrals vanish so that the Shupe bias error due to any cosinusoidal term is zero, which is expressed mathematically as $$\Delta\Phi_{Shupe, n}(t) = 0. \quad (32)$$

Shupe Bias Error Due to Sinusoidal Terms

Finally, the integrals of Eq. (21) are evaluated using terms of the form $\epsilon_m(r, z, t) \sin m\theta$. Again the factor $$\frac{\partial \epsilon_m}{\partial t}\bigg|_{r_j,z_j,t}$$

can be taken out of the integrals. Thus, for each turn m, there is a Shupe bias error equal to:

$$\Delta\Phi_{Shupe,n}(t) = \frac{2\tau}{L_c} \left\{ \sum_{i=1}^{N_{CCW}} r_i \frac{\partial \epsilon_n}{\partial t}\bigg|_{r_j,z_j,t} \int_0^{2\pi} (r_i\theta + s_{io}) \sin m\theta d\theta + \right. \quad (33)$$

-continued $$\sum_{i=1}^{N_{CW}} r_j \frac{\partial \epsilon}{\partial t} \bigg|_{r_j,z_j,t} \int_{-2\pi}^{0} (r_j\theta - s_{jo})\sin m\theta d\theta \bigg\} .$$

Performing an integration by parts yields the following result for the CCW turns:

$$\int_{0}^{2\pi} \theta \sin m\theta = -\frac{\theta \cos m\theta}{m} \bigg]_{0}^{2\pi} - \int_{0}^{2\pi} \frac{\cos m\theta}{m} d\theta = -\frac{2\pi}{m} . \quad (34)$$

and $$\int_{0}^{2\pi} (r_i\theta + s_{io})\sin m\theta d\theta = -\frac{2\pi r_i}{m} . \quad (35)$$

Similarly for the CW turns:

$$\int_{-2\pi}^{0} \theta \sin m\theta = -\frac{\theta \cos m\theta}{n} \bigg]_{-2\pi}^{0} - \int_{-2\pi}^{0} \frac{\cos m\theta}{m} d\theta = 0 = -\frac{2\pi}{m} \quad (36)$$

and $$\int_{-2\pi}^{0} (r_i\theta - s_{io})\sin m\theta d\theta = -\frac{2\pi r_j}{m} . \quad (37)$$

Therefore, the Shupe bias error due to the $m^{th}$ sinusoidal term of the phase perturbation function is given by $$\Delta \Phi_{Shupe,n}(t) = 4\pi \frac{\tau}{mL_c} \bigg\{ \sum_{i=1}^{N_{CCW}} r_i^2 \frac{\partial \epsilon_n}{\partial t} \bigg|_{r_j,z_j,t} + \quad (38)$$

$$\sum_{j=1}^{N_{CW}} r_j^2 \frac{\partial \epsilon_n}{\partial t} \bigg|_{r_j,z_j,t} \bigg\} .$$

It should be noted that, similarly to Eq. (26), no integrals are involved in Eq. (38), only sums. Furthermore, Eq. (38) shows that the contributions from all the fiber turns add up independently of the fact of being CW or CCW turns. Therefore, we can rewrite the second-hand member of Eq. (38) as a sum over all fiber turns in the coil.

$$\Delta \Phi_{Shupe,n}(t) = 4\pi \frac{\tau}{mL_c} \sum_{i=1}^{N_T} r_i^2 \frac{\partial \epsilon_n}{\partial t} \bigg|_{r_j,z_j,t} . \quad (39)$$

where $$N_T = N_{CCW} + N_{CW} . \quad (40)$$

In this disclosure it has been shown that the evaluation of the Shupe bias error can be reduced to a calculation of sums for all possible phase perturbation functions. Two expressions were derived for the Shupe bias error according to the $\theta$-dependence of the perturbation, Eqs. (26), (38) or (39).

In Eq. (26) the quantities $r_j$, $r_j$, $s_{jo}$, $s_{jo}$, are all real and positive. Therefore, Eq. (26) shows that the contribution of the CCW turns and the contribution of the CW turns have opposite signs, that is, they tend to cancel each other (if the time-derivatives of the phase perturbations have the same sign). This is the same conclusion attained previously. However, it has now been shown that this conclusion is valid only for a phase perturbation function that is independent of $\theta$ (axisymnmetrical perturbation) or for the Fourier term of the perturbation function which is independent of $\theta$.

Eq. (26) applies to Shupe bias due to time-varying temperature gradients ("Shupe 1") when the gradients are mainly radial and/or axial. It also applies to Shupe bias due to temperature-dependent pressure gradient ("Shupe 2") caused, for example, by thermal expansion of the spool. In all these cases the phase perturbation function is axisymmetrical.

Contrary to what was previously stated for Eq. (26), in Eq. (38) and (39) the contributions of CW and CCW turns add up instead of subtract (depending on the sign of the time derivative of the perturbation function). In fact, that Eq. shows that it does not really matter whether a turn belongs to the CCW or to the CW halves of the coil, as far as sinusoidal terms of the perturbation are concerned.

The dynamic strain due to transverse vibration is a sinusoidal function of $\theta$. Therefore, the conclusions stated above, obtained from Eq. (38) or (39) apply to transverse vibration.

Eqs. (38) and (39) apply also to Shupe bias due to temperature gradients that are not axisymmetrical (at least to the sinusoidal components of the corresponding phase perturbation function).

Correlation Between Coil Axial Bias Vibration Response and Length of Potted Section of Coil FIGS. 6–13 graphically illustrate AC bias vibration data of eight fiber optic rotation sensor coils fabricated using a carbon-black filled silicone as disclosed in U.S. Pat. No. 5,546,482, issued to A. Cordova and G. M. Surabian for Potted Fiber Optic Gyro Sensor Coil for Stringent Vibration and Thermal Environments. The disclosure of U.S. Pat. No. 5,546,482 is hereby incorporated by reference into the present disclosure. It has been found that such coils have negligible transverse vibration sensitivity. Therefore, one embodiment of this invention is directed to the response of such coils to axial vibrations.

The vibration response of a fiber optic rotation sensor coil is expressed in terms of the bias in degrees per hour divided by the product of the vibration frequency times the acceleration. It is convenient to express the acceleration in g's where g is the acceleration of gravity. The axial vibration sensitivity of the coils tested ranges from negligible to about $0.6 \times 10^{-3 \circ}/\text{sec/g Hz}$.

Furthermore, a strong correlation has been found between the measured axial vibration sensitivity and the length of the potted section of the coil. It is understood that the length of the potted section of the coil does not include fiber lead lengths. This is an important result since it suggests that the coil axial bias vibration sensitivity can be greatly reduced by properly selecting and controlling its length. One way to achieve control of the coil length involves selecting and controlling the volume of potting material applied to the coil during winding. Because of the mathematical nature of the Shupe bias error due to temperature ramps, as explained above, it is expected that the correlation with potted length is also present in the case of bias temperature ramp sensitivity.

Figure 14:
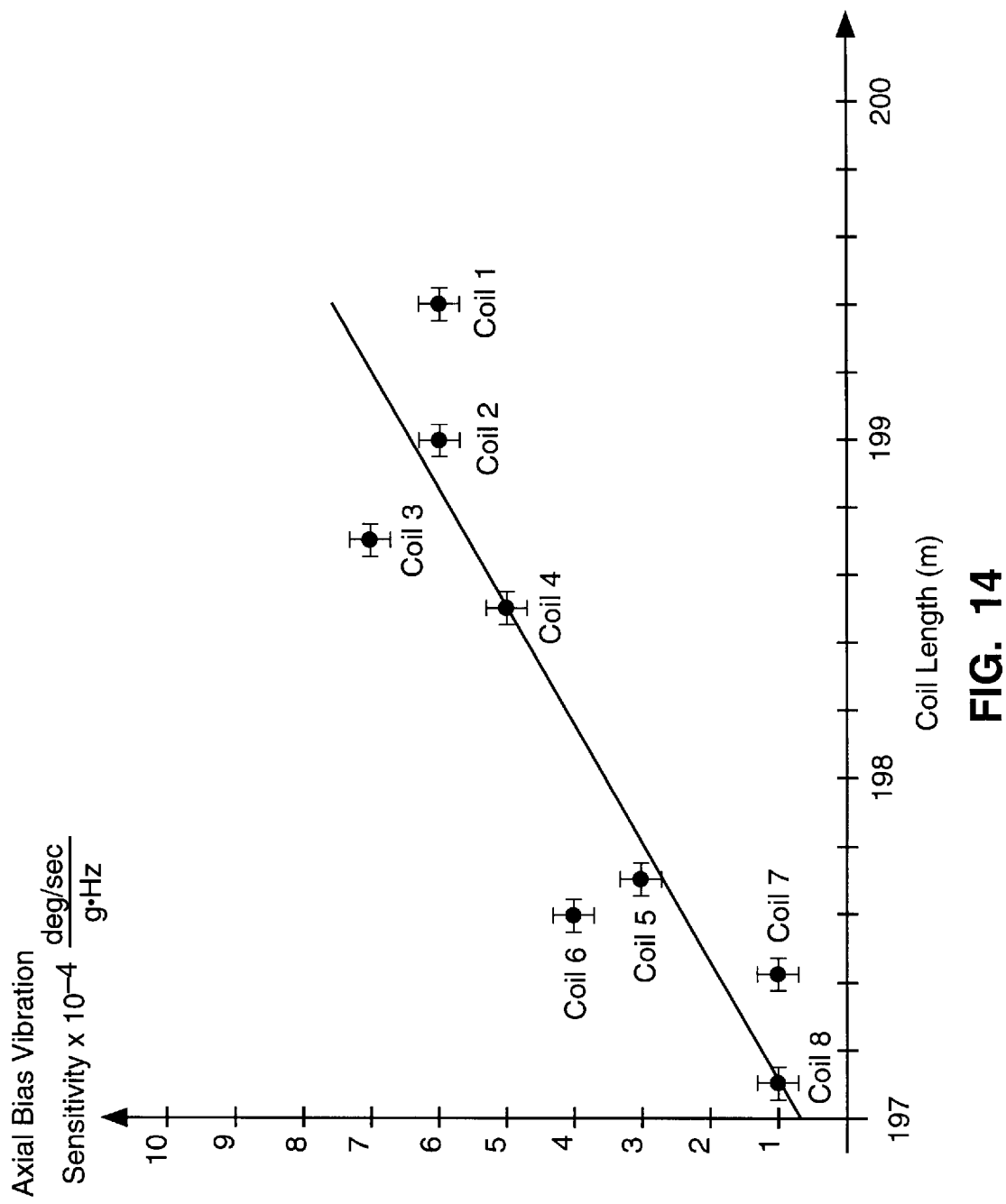
FIG. 14 graphically illustrates bias axial vibration sensitivity as a function of potted coil length.

The following table summarizes the potted coil length data and the axial bias vibration data for the eight core coils mentioned above. The length data was inferred from measurement of the gyro proper frequency and knowledge of the fiber refractive index and then subtracting the coil fiber lead lengths (including multifunction integrated optic chip lead lengths). The axial bias vibration sensitivity was obtained by performing a linear fit on the measured vibration data shown in FIGS. 6–13. FIG. 14 graphically illustrates the data of the table.

Correlation Between Coil Potted Length And
Axial Bias Vibration Response

| Coil No. | Potted length (meters) | Axial bias vibration response (°/sec/g Hz) |
|---|---|---|
| 1 | 199.41 | $6 \times 10^{-4}$ |
| 2 | 199.02 | $6 \times 10^{-4}$ |
| 3 | 198.67 | $7 \times 10^{-4}$ |
| 4 | 198.44 | $5 \times 10^{-4}$ |
| 5 | 197.69 | $3 \times 10^{-4}$ |
| 6 | 197.49 | $4 \times 10^{-4}$ |
| 7 | 197.42 | $<1 \times 10^{-4}$ |
| 8 | 197.08 | $<1 \times 10^{-4}$ |

FIG. 14 shows a plot of axial bias vibration response versus coil potted length for these eight coils. A trend of increasing vibration response with increasing length can be seen. Even though not all the points lie on a straight line, it is possible to make a fit with a slope of $$m = 3 \times 10^{-4} \frac{°/\text{sec}}{g \cdot Hz} \text{ per meter.}$$

This data in the foregoing table suggests that in order to reduce the coil axial bias vibration sensitivity, (1) the nominal potted length should be about 197.00 m and (2) the tolerance in coil length should be about 50 cm (or 0.25 % of the coil length). From the table shown above it may be inferred that the present average "potted" length of the coils is 198.15 and that variation in length from coil to coil is about 1.2%. A similar study may be performed on gyro coils of nominally any length other than 198 meters.

This embodiment of the invention is directed to ways to reduce the average length by about one meter and the variability by a factor of 5. In this particular embodiment the main coil parameter affecting coil to coil length variability is the volume of potting material applied during the winding process.

This invention reduces the bias vibration sensitivity and the bias temperature-ramp sensitivity of fiber optic rotation sensors by controlling and adjusting coil geometrical factors including the coil potted length, the adhesive layer thickness, the number of turns per layer, the number of layers and the way the winding is terminated. The windings may be terminated to form the coil as a complete quadrupole, a diapole, an incomplete quadrupole or an incomplete diapole.

The Shupe effect calculation predicts that when the environmental thermal or vibratory perturbation is axisymmetric (independent of the azimuth or angle θ) then the contributions of the clockwise turns and the contributions of the counterclockwise turns to the Shupe bias integral have opposite signs. Thus, by using special windings such as the quadrupole winding, these contributions tend to cancel each other. An axisymmetric perturbation can be expanded as a Fourier series of the azimuth. Thus, the statement made above applies to the azimuth-independent term of this Fourier series.

Even though quadrupole winding is helpful in reducing the overall Shupe bias due to axisymmetric perturbations, there is always a small "residual bias" due to an incomplete cancellation of the different contributions within the same quadrupole. These residual biases due to the different quadrupoles add up to an overall bias error. By adjusting some geometrical factors of the coil design, a coil for which the residual net Shupe bias is negligible is obtained. As an example, the coil potted length can have a major effect on bias vibration sensitivity.

The method for obtaining the desired reduction in Shupe bias (due to either vibration or thermal ramp sensitivity) comprises the steps of 1. Defining the coil geometrical factors (potted length, turns per layer, number of layers, adhesive thickness) based on system/gyro constraints such as maximum volume allocated and desired Sagnac scale factor;

2. Selecting a geometrical factor (e.g. adhesive thickness) as a variable parameter;

3. Winding several coils in which the selected geometrical factor is varied;

4. Measuring Shupe bias (either vibration response of thermal ramp response);

5. Selecting the optimum value and tolerance for the selected geometrical factor. (In the embodiment presented herein this was the value of 197 m±0.5 m for the potted length.)

6. Controlling the geometrical factor within the specified tolerance during the coil fabrication process.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing descriptions define the scope of the invention. All modifications to the embodiments described herein that come within the meaning and range of equivalence of the claims are embraced within the scope of the invention.

What is claimed is:

1. A method for reducing non-reciprocal bias errors caused by the Shupe effect, comprising the steps of:

forming an optical fiber coil from a length of optical fiber;

determining a nominal optimum length of the optical fiber to minimize the Shupe effect due to vibration of the optical fiber coil;

potting the coil with a potting material;

defining the number of layers in the optical fiber coil so its nominal potted length is a predetermined length that provides a reduction in the Shupe effect due to vibration;

measuring the Shupe bias in the coil due to vibration; and adjusting the length of the optical fiber to obtain a minimum value of the Shupe bias due to vibration.

2. The method of claim 1, further including the step of controlling the length of the optical fiber coil so its nominal potted length provides a reduction in the Shupe effect due to temperature ramps.

3. A method for reducing non-reciprocal bias errors caused by the Shupe effect in a fiber optic coil, comprising the steps of:

defining a set of geometrical parameters for the coil;

selecting a member of the set of geometrical parameters;

determining a nominal optimum length of the optical fiber to minimize the Shupe effect due to vibration of the fiber optic coil;

winding a plurality of fiber optic coils in which the selected geometrical parameters is varied;

measuring the Shupe bias due to vibration in each of the plurality of fiber optic coils;

selecting the optimum value and tolerance for the selected geometrical parameters to minimize the Shupe bias due to vibration in each of the plurality of fiber optic coils; and controlling the selected geometrical parameters within the selected tolerance while fabricating the coil.

* * * * *